(12) United States Patent
Skirha et al.

(10) Patent No.: US 6,241,836 B1
(45) Date of Patent: *Jun. 5, 2001

(54) VARIABLE HIGH PRESSURE VIBRATION WELDING PROCESS

(75) Inventors: Martin Dirk Skirha; Edward Ray Novinger; William Alan Nyberg, all of Anderson, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/324,059

(22) Filed: Oct. 17, 1994

(51) Int. Cl.$^7$ .................................................. B32B 31/16
(52) U.S. Cl. ........................................ 156/73.5; 156/292
(58) Field of Search .................... 156/73.1, 73.5, 156/73.6, 290, 292; 264/68

(56) References Cited

U.S. PATENT DOCUMENTS

| | | | |
|---|---|---|---|
| 3,973,064 | 8/1976 | Paine | 428/60 |
| 4,190,093 | 2/1980 | Kearney et al. | 164/34 |
| 4,601,927 | 7/1986 | Durfee | 428/35 |
| 4,636,124 * | 1/1987 | Gugle et al. | 156/73.5 X |
| 4,938,831 | 7/1990 | Wolf, Jr. | 156/275.3 |
| 5,092,643 | 3/1992 | Okamoto et al. | 293/155 |
| 5,228,420 | 7/1993 | Furuya et al. | 123/90.38 |
| 5,264,661 | 11/1993 | Luettgen | 174/52.3 |
| 5,288,350 | 2/1994 | Kita | 156/73.1 |
| 5,308,718 | 5/1994 | Eidler et al. | 429/152 |
| 5,360,499 * | 11/1994 | Savovic et al. | 156/73.1 |
| 5,421,925 * | 6/1995 | Kulaszewicz et al. | 156/73.5 |
| 5,464,171 * | 11/1995 | Ripplinger | 242/609.1 |

OTHER PUBLICATIONS

Potente, Helmut and Harald Kaiser, "Process Data Acquisition in Vibration Welding of Thermoplastics", *Polymer Engineering and Science,* Mid–Dec. 1989, vol.29, No. 23, pp. 1661–1666.

Potente, Helmut and Harald Kaiser, "Process Analysis of Vibration Friction Welding", *Welding and Cutting,* Dec. 1989, pp. E208–E210.

White, Paul, "Vibration Welding of Thermoplastics", *Joining & Materials,* Dec. 1988, pp. 277–279.

"Characteristics and Compatibility of Thermoplastics for Ultrasonic Assembly", Branson Ultrasonics Corporation, Technical Information brochure PW–1, Mar. 1992.

"Designing Parts for Ultrasonic Welding", Branson Ultrasonics Corporation, Technical Information brochure PW–3, Jul. 1991.

* cited by examiner

*Primary Examiner*—James Sells
(74) *Attorney, Agent, or Firm*—Ice Miller; Jay G. Taylor; Brian T. Ster

(57) ABSTRACT

The practice of joining two thermoplastic resin bodies with widely disparate melting temperatures is enhanced by providing a shallow, roughened surface on at least the higher melting point body. When the parts are clamped together for frictional engagement, the roughened surface increases the local pressure, accelerates the formation of a molten film between the bodies and provides a strengthening mechanical interlock in the welded joint.

9 Claims, 1 Drawing Sheet

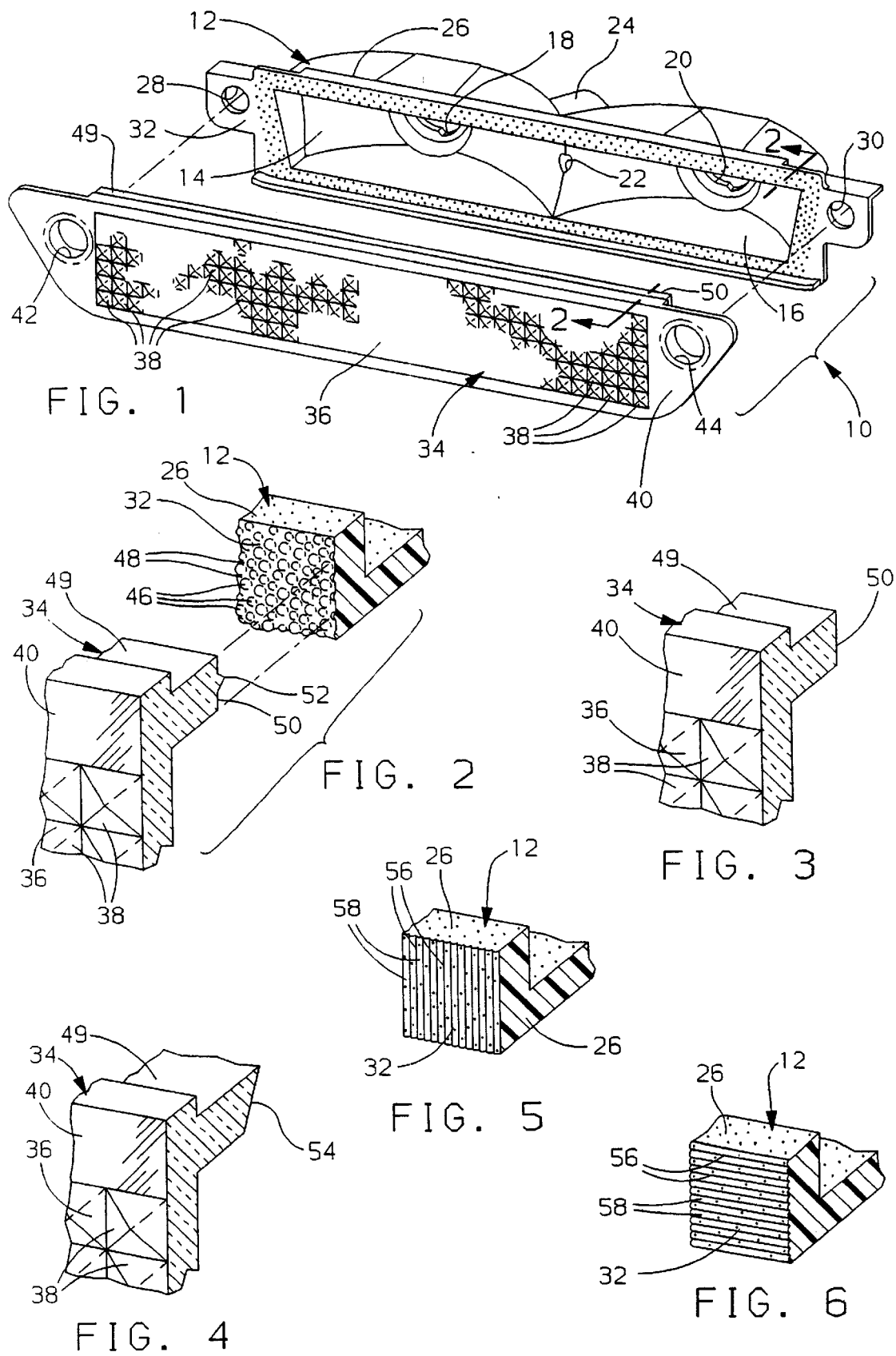

VARIABLE HIGH PRESSURE VIBRATION WELDING PROCESS

This invention pertains to the joining of thermoplastic resin bodies by vibration welding. More specifically, this invention relates to a practice that enhances the quality and speed of the vibration welding of abutting thermoplastic resin bodies that have widely separated melting temperatures.

BACKGROUND OF THE INVENTION

It is often desirable or necessary to make an assembled product by welding together two thermoplastic resin parts. There are many families of thermoplastic resin compositions such as, e.g., polyethylene, polypropylene, nylon, polyvinyl chloride, acrylic and methacrylic resins, and polycarbonate. These materials are all readily moldable or otherwise shapable into bodies that can then be welded into an assembled part.

Linear vibration welding is a known practice that is used to rapidly rub abutting complementary surfaces of thermoplastic bodies together along a joint line such that the high speed rubbing melts plastic adjacent the joint. When the rubbing is stopped and the joint cools, a welded bond is formed. The practice is particularly useful for the bonding of two thermoplastic resin bodies having chemically compatible and structurally complementary abutting surfaces. The two bodies are pressed together along designed abutting surfaces, and a resonant system is used to produce vibratory motion, usually along a single axis, of the surfaces. The back and forth motion has an amplitude of, for example, 0.060 to 0.120 inches (1.5 to 3.0 mm) at a frequency of, for example, 120 hertz or 240 hertz.

Linear vibration welding differs from ultrasonic plastic welding, which is more widely used. In ultrasonic plastic welding, high frequency mechanical vibrations, for example 20 to 40 kilohertz, are transmitted through the ultrasonic horn or tool to produce heat in the assembled parts to be welded. Linear vibration welding uses low frequency mechanical rubbing to produce frictional heat in abutting pieces. The usual joint in vibration welding is a butt joint, and it can be considerably larger than like joints made by ultrasonic welding. Linear vibration welding is also generally considered to be a more tolerant process, especially when thermoplastic resin bodies of differing melt or softening temperatures are to be joined. However, where the thermoplastic resin bodies differ in melting point by a substantial amount, for example upwards of 80° F. to 100° F., it is often difficult to obtain a rapid and clean welded joint. The lower melting body fuses, and molten material is expressed from the joint by the high pressure of the unsoftened higher melting point body required to generate the frictional heat. The expressed flash does not contribute to the strength of the weld, and the overabundant melt from the lower melting point part does not necessarily form a strong bond to the unmelted, higher melting part.

It is an object of the present invention to provide a method of increasing the welding rate and weld strength between thermoplastic resin bodies having disparate softening or melting temperatures. It is a more specific object of the present invention to provide a linear vibration welding method for joining disparate melting point thermoplastic resins in which the welding surface of the higher melting body is configured so as to initially generate localized high pressure to induce suitable controlled rapid melting of both bodies and also to provide a strengthened mechanical interlocking bond in the welded joint.

SUMMARY OF THE INVENTION

In accordance with a preferred embodiment of our invention, these and other objects are accomplished in accordance with the following practice. While our invention is of general applicability to the vibration welding of thermoplastic resin bodies, it will be described in terms of the welding of a polycarbonate resin automobile lamp housing to a polymethylmethacrylate lens. In these applications, the polycarbonate housing is employed for its high temperature resistance and its toughness, while the methacrylate lens is employed for its optical transmission properties. The polycarbonate resin has a typical melting point or softening point, for example of the order of 300° F. to 310° F., while the softening temperature of the polymethylmethacrylate lens is the order of 90° F. to 100° F. lower. In normal practice, the edge of the lens member and the abutting surface of the polycarbonate housing member are both molded so that they are flat and of smooth complementary configuration. Thus, they can be pressed together in full engagement during the vibration welding process.

In accordance with our practice, the welding surface of the polycarbonate housing is stippled, knurled or otherwise roughened over substantially all of the intended contact area. The roughening is characterized by a continuous pattern of peaks and valleys of an amplitude up to about one-half of a millimeter. The bonding surface of the methacrylate lens may be flat for its full contact with the abutting housing surface or it may be tapered for only edge contact. When the bodies are pressed together at their bonding surfaces, the stippled or ribbed surface of the polycarbonate housing initially has only peak contacts with the abutting lens surface. Even though substantial clamping force is applied, the initial limited contact facilitates the linear rubbing across the whole joint. The peaks apply intense local pressure against the lower melting methacrylate surface and rapidly induce melting of both the lens surface and a portion of the peak surface on the housing to produce a film between them comprising material from both members. The process is preferably controlled so that a portion of the small peaks of the housing surface remain unmelted and penetrate into the molten film. When the rubbing is stopped, the molten material hardens between the unmelted portions of the peaks and in the valleys of the roughened polycarbonate surface. The entire practice can suitably be accomplished in the order of one to three seconds under a suitable clamping pressure of the order of 1000 to 2500 pounds per square inch. Due to the mechanical interlock between the roughened housing surface and the penetrated lens surface, the bond strength between the welded pieces is increased.

Other objects and advantages of our process will become more apparent in view of a detailed description thereof which follows.

BRIEF DESCRIPTION OF THE DRAWINGS

FIG. 1 is an exploded perspective view showing an automobile lamp housing and lens assembly preparatory to linear vibration welding in accordance with the subject invention.

FIG. 2 is a fragmental sectional view of the lens and housing taken along line 2—2 of FIG. 1.

FIG. 3 is a fragmental sectional view showing an alternative construction for the lens member in FIG. 2.

FIG. 4 is a fragmental sectional view showing another alternative construction for the lens member depicted in FIG. 2.

FIGS. 5 and 6 are fragmental sectional views showing alternative constructions for the housing member depicted in FIG. 2.

DESCRIPTION OF THE PREFERRED EMBODIMENT

The practice of our variable high pressure vibration welding process will be illustrated in the formation of an automobile lamp assembly. This application is typical of many automotive applications and other industrial applications of assemblies of two or more thermoplastic parts that may be bonded together utilizing our process. The process is particularly applicable when the parts to be joined are formed of different thermoplastic resin compositions having softening or melting temperatures that differ by as much as 80° F. or 100° F. or more.

Linear vibration welding is typically used to weld together flat and smooth complementary abutting faces of two thermoplastic resin pieces. The surfaces to be welded are pressed together at a suitable pressure, for example, 1000 to 2500 pounds per square inch of contacting surface to be welded. The conventional practice is then to rub the faces together in a linear back and forth motion (i.e., linear vibration) to generate heat from the frictional resistance between the rubbing surfaces. The heat at the interface melts a layer portion of one or both of the surfaces. The rubbing is then stopped while pressure is continually applied to the engaged surfaces. When the rubbing is stopped, the melted portions are cooled by the surrounding masses to resolidify to form a weld bond. The amplitude or the stroke of the rubbing motion is typically of the order of 0.060 to 0.120 inches, and the frequency of the stroke is relatively low, of the order of 90 to 120 hertz or even as high as 200 to 240 hertz. Linear vibration welding is typically used to form butt joints between substantially planar surfaces, and the width or cross-section of the abutting surfaces is usually greater than the amplitude of the welding stroke. Normally, he welding stroke is back and forth along a straight line, although in some applications the welding motion may be circular or orbital. Commercially available machines with suitable fixtures press the pieces together and rub them as described to produce the molten welding medium.

FIG. 1 illustrates in exploded perspective view a molded thermoplastic polycarbonate resin housing member and a molded polymethylmethacrylate lens member for assembly into an automotive center high mounted stop lamp assembly. The two-piece combination aligned for assembly is indicated at 10.

Polycarbonate housing member 12 includes two identical, side-by-side lamp chambers 14 and 16. The back wall of each chamber is of parabolic configuration so as to direct the light rays from lamps (not shown) forward in generally parallel lines. The lamps would be inserted through socket openings 18 and 20 in the rear of chambers 14 and 16, respectively. A vent hole 22 is formed in the rear wall of housing 12 with a rearwardly extending vent shield 24. The front of the molded integral housing 12 is defined by a vertical, generally rectangular peripheral and flat frame portion 26 with holes 28 and 30 at the side portions for attachment of the housing 12 to an automobile surface. Front face 32 of frame portion 26 is the surface of the housing 12 that will be welded to the lens.

The lens member of the lamp is indicated generally at 34. Lens 34 is typically molded as a unitary body of polymethylmethacrylate or other suitable resinous composition for high light transmission. Lens 34 comprises a central integrally formed optical portion 36 with a large number of optical facets or light conduits 38 that serve to refract the light from housing 12 into many directions for easy viewing by drivers of other automobiles. In the case of a top lamp assembly, the lens 34 will be colored red. Optical portion 36 is molded with an integral peripheral frame 40 with attachment holes 42 and 44.

Extending rearwardly from frame portion 40 of lens 34 as depicted in FIG. 1 is an integral peripheral rectangular rim member 49 that is adapted in accordance with our invention to be pressed against surface 32 of housing 12 to ultimately provide a weld joint between these two thermoplastic resin members.

In the case of this lamp assembly 10, the polycarbonate housing assembly has a melt temperature of 310° F. while the polymethylmethacrylate lens member has a melting or softening temperature of 214° F. This wide difference, some 96 Fahrenheit degrees, makes it difficult to rapidly form a strong welded joint between the members because the acrylic member becomes so much softer and fluid than the polycarbonate member that polymethylmethacrylate material is forced out of the weld region and it is difficult to maintain the dimensions of the members and to obtain a uniform weld around the whole periphery of the abutting members.

In accordance with the practice of our method, we form on the abutting surface of the higher melting point thermoplastic resin body (i.e., surface 32 of lamp housing 12) a roughened surface characterized by a substantially uniform pattern of a large number of peaks 46 and valleys 48 where the distance between the tops of the peaks 46 and the bottoms of the valleys 48 is of the order of 0.005 to 0.020 inch (0.13 to 0.51 mm). We prefer that the distance between the peaks and valleys be on average about 0.010 to 0.015 inch. This surface can be formed in the molding of the body by providing a roughened (e.g., etched) surface on the molding die so that the surface 32 of housing member 12 is stippled or a random pattern of fairly uniform peak heights and valley depths. The stippled pattern is formed around the entire area of surface 32 where the weld is to be formed. Such a stippling pattern is preferred in the practice of our invention because it is easy to form in the appropriate surface of the molding die and it provides a uniformly roughened welding surface 32 in the abutting surface of the high temperature melting thermoplastic resin member. This regular pattern permits the linear rubbing or vibration movement to take place in any desired direction.

This roughened surface on the abutting surface (e.g., surface 32 in FIGS. 1 and 2) of the high melting temperature piece to be welded serves at least three purposes. First, the peaks of the roughened area provide limited area contact with the complementary surface on the lower melting point temperature piece to be joined. This limited contact means that when the parts are pressed together for the welding operation, a relatively high pressure is obtained under each peak 46 utilizing moderate clamping forces. Second, because of the limited area contact, the high pressure on each peak 46 still permits the parts to slide past each other in the vibration welding motion. The high pressure at the peaks provides sufficient local friction between the engaged surfaces to induce melting in both bodies to be joined. Third, the peaks 46 provide a selected source of welding material in the higher melting temperature part. Preferably, the rubbing process is controlled so that only a portion of the material in peaks 46 is melted and the remainder of the peak material is available to form an interlocking mechanical bond.

In accordance with our process, the complementary surface of the lower melting section, in our example the polymethylmethacrylate lens member, can be flat and smooth. As shown in FIG. 3, surface 50 of rim member 49 on the polymethylmethacrylate member is flat and smooth and adapted to be engaged by the stippling 46, 48 on polycarbonate surface 32. The peaks 46 of the stippling rub against flat surface 50 to quickly melt a thin layer on both surfaces (not shown). Once a coextensive molten film between peaks 46 and the flat surface 50 has been formed, the linear vibration movement is stopped, pressure is maintained, and the residue of the stippled peaks 46 of surface 32 penetrate into the melt on surface 50 to form an interlocking mechanical bond upon solidification of the film. Thus, while a flat complementary surface (e.g., 50 in FIG. 3) on the abutting lens member is suitable for the practice of our invention, there are other configurations that we prefer.

Referring to FIG. 2, the acrylic lens member 34 is shown having a triangular tip 52 extending outwardly from surface 50 of rim 49. Tip 52 extends about 0.010 to 0.020 inches from the otherwise flat outer surface 50 of rim member 49. Thus, when the housing member 12 and the lens member 34 are aligned as shown in FIG. 1, pressed together and rubbed longitudinally to weld the members together, tip 52 first engages the peaks 46 of stippled surface 32. The use of tip 52, which extends around the entire periphery of rim member 49, temporarily increases the pressure when it is in engagement with stippled surface 32. This facilitates a relatively low clamping load with initially, high pressure and friction between the tip 52 and the stippled (i.e., peaks 46 and valleys 48) surface 32 to start melting but facilitate sliding. Once the melt starts and tip 52 has been melted away, additional molten film (not shown) on member 49 can be formed before the vibration motion is stopped and the melt is allowed to solidify. Once again, the unmelted portions of peaks 46 in stippled surface 32 penetrate into the melt on rim 49 to form an interlocking mechanical bond when the melt solidifies to effect the weld.

FIG. 4 illustrates another form for the complementary abutting surface on rim 49 of the lens member 34. In this case, instead of a small peak in the middle of the abutting surface, the entire surface 54 is sloped or tapered so that it is about 0.010 to 0.020 inches higher from frame 40 at one edge than the other. Thus, the first engagement between rim member 49 of the acrylic lens and the roughened surface 32 of the housing is at the tip edge of the tapered surface 54 and peaks 46. Once again, the limited contact between the abutting surfaces provides initial high pressure with modest clamping force. The initial high pressure induces rapid melt formation of the surface of the acrylic member with some concomitant melt formation on the higher melting polycarbonate member. After the peak surface 54 of rim 49 is melted, the entire outer surface of rim 49 forms a film of molten material which receives the unmelted portion of protuberant peaks 46 of surface 32. When the vibratory motion is stopped and the film solidifies, an interlocking mechanical bond is formed between the partially melted polycarbonate member and the resolidified film on the acrylic member.

FIGS. 5 and 6 show different embodiments for the roughened surface 32 on the polycarbonate housing member. Instead of a stippled surface, a group of parallel valleys 56 and peaks 58 are formed either by knurling of the polycarbonate surface or by suitable machining of the mold surface in which the body is formed. The parallel peaks 58 and valleys 56 depicted in FIG. 5 are aligned vertically and in FIG. 6 are aligned horizontally. They serve the same purpose as the stippling depicted in FIGS. 1 and 2.

In summary, the practice of our variable, initially high pressure vibration welding process is to provide a roughened surface of limited height dimension on the intended abutting surface of the higher melting thermoplastic resin body to be joined. The lower melting body may have a complementary flat, smooth surface, or it may also have a friction concentration of limited height dimension. The advantage of using the single or two roughened surfaces is that the initial contact pressure is quite high, although of limited surface area. It quickly induces initial melting on both parts with relatively low clamping pressure. As the molten film is formed from both bodies to be joined, it provides a slippery surface for the vibratory motion to continue under reduced pressure until a coextensive film is formed between the bodies. At this point, the vibratory motion is stopped, clamping pressure is maintained, and the unmelted portions of the roughened surface of the higher melting point member penetrate into the film and form an interlocking mechanical bond when solidification has occurred and the weld is completed. By using the roughened surfaces, we find that our vibration weld process can be carried out in a shorter period of time. For example, we are able to weld the lamp housing assembly depicted in FIG. 1 within three seconds, whereas as much as ten seconds is required to obtain a suitable weld when both members are flat and smooth. Furthermore, we consistently obtained better dimensional control and a stronger welded joint in the reduced welding period with the subject process.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A method of making a welded bond between complementary abutting surfaces of two thermoplastic resin bodies having disparate melting temperatures, comprising:

forming the higher melting resin body with an abutting surface characterized by a pattern of peaks and valleys having an amplitude of up to one-half of one millimeter, pressing said abutting surface of said higher melting body against the complementary abutting surface of a said lower melting point resin body, rubbing the engaging surfaces together while controlling the pressure of engagement, the amplitude and duration of the rubbing so as to melt at least a portion of said peaks on the higher melting body and the surface region of the lower melting point resin body, and stopping the rubbing and allowing the molten material between the two bodies to solidify so that a weld joint is formed between the bodies.

2. A method of making a welded bond between complementary abutting surfaces of two thermoplastic resin bodies having disparate melting temperatures, comprising:

forming the higher melting resin body with an abutting surface characterized by a pattern of peaks and valleys having an amplitude of up to one-half of one millimeter, pressing said abutting surface of said higher melting body against the complementary abutting surface of a said lower melting point resin body, rubbing the engaging surfaces together while controlling the pressure of engagement, the amplitude and duration of the rubbing so as to melt only a portion of the material of said peaks on the higher melting body and the surface region of the lower melting point resin body, and stopping the rubbing and allowing the molten material between the two bodies to cool so that a weld joint is formed between the solidified originally molten material and the unmelted portion of the peaks and valleys of the higher melting body.

3. A method of making a welded bond between complementary abutting surfaces of two thermoplastic resin bodies having disparate melting temperatures, comprising:

forming the higher melting resin body with an abutting surface characterized by a pattern of peaks and valleys having an amplitude of up to one-half of one millimeter, forming the lower melting resin body with an abutting surface shaped to be welded to said higher melting surface and comprising a peak extending up to about one-half of one millimeter from said shaped surface, pressing said abutting surface of said higher melting body against said abutting surface of said lower melting point resin body, rubbing the engaging surfaces together while controlling the pressure of engagement, the amplitude and duration of the rubbing so as to melt only a portion of the material of said peaks on the higher melting body and the peak and adjacent surface region of the lower melting point resin body, and stopping the rubbing and allowing the joint region between the two bodies to cool so that a weld joint is formed between the solidified originally molten material and the unmelted portion of the peaks and valleys of the higher melting body.

4. A method of making a welded bond as recited in claim 1 comprising forming the higher melting resin body with an abutting surface characterized by a pattern of uniformly distributed peaks and valleys.

5. A method of making a welded bond as recited in claim 1 comprising forming the higher melting resin body with an abutting surface characterized by a pattern of parallel ridge peaks with intervening valleys.

6. A method of making a welded bond as recited in claim 2 comprising forming the higher melting resin body with an abutting surface characterized by a pattern of uniformly distributed peaks and valleys.

7. A method of making a welded bond as recited in claim 2 comprising forming the higher melting resin body with an abutting surface characterized by a pattern of parallel ridge peaks with intervening valleys.

8. A method of making a welded bond as recited in claim 3 comprising forming the higher melting resin body with an abutting surface characterized by a pattern of uniformly distributed peaks and valleys.

9. A method of making a welded bond as recited in claim 3 comprising forming the higher melting resin body with an abutting surface characterized by a pattern of parallel ridge peaks with intervening valleys.

* * * * *